(12) United States Patent
Kamei

(10) Patent No.: US 7,593,551 B2
(45) Date of Patent: Sep. 22, 2009

(54) FACE META-DATA GENERATION AND FACE SIMILARITY CALCULATION

(75) Inventor: Toshio Kamei, Tokyo (JP)

(73) Assignee: NEC Corporation, Tokyo (JP)

( * ) Notice: Subject to any disclaimer, the term of this patent is extended or adjusted under 35 U.S.C. 154(b) by 876 days.

(21) Appl. No.: 10/488,213

(22) PCT Filed: Dec. 16, 2002

(86) PCT No.: PCT/JP02/13114

§ 371 (c)(1),
(2), (4) Date: Feb. 26, 2004

(87) PCT Pub. No.: WO03/052690

PCT Pub. Date: Jun. 26, 2003

(65) Prior Publication Data

US 2004/0197013 A1    Oct. 7, 2004

(30) Foreign Application Priority Data

Dec. 14, 2001   (JP) .............................. 2001-381530

(51) Int. Cl.
*G06K 9/00* (2006.01)
(52) U.S. Cl. ................... 382/118; 382/125; 382/228
(58) Field of Classification Search ................ 382/118, 382/125, 228
See application file for complete search history.

(56) References Cited

U.S. PATENT DOCUMENTS

| | | | | |
|---|---|---|---|---|
| 5,410,609 A | * | 4/1995 | Kado et al. ................ | 382/118 |
| 5,710,833 A | * | 1/1998 | Moghaddam et al. ....... | 382/228 |
| 6,067,369 A | * | 5/2000 | Kamei ........................ | 382/125 |
| 6,108,437 A | * | 8/2000 | Lin ............................. | 382/118 |
| 6,111,978 A | * | 8/2000 | Bolle et al. ................. | 382/125 |
| 6,151,403 A | * | 11/2000 | Luo ........................... | 382/117 |
| 6,292,575 B1 | * | 9/2001 | Bortolussi et al. .......... | 382/118 |

(Continued)

FOREIGN PATENT DOCUMENTS

JP        5-20442        1/1993

(Continued)

OTHER PUBLICATIONS

Senior, A. W., "Recognizing faces in broadcast video", Recognition, Analysis, and tracking of faces and gestures in real-time systems, 1999. Proceedings. International Workshop on Corfu, Greece, Sep. 26-27, 1999, Los Alamitos, CA, USA, IEEE Comput. Soc, US, Sep. 26, 1999, pp. 105-110.

(Continued)

*Primary Examiner*—Bhavesh M Mehta
*Assistant Examiner*—Michael Vanchy, Jr.
(74) *Attorney, Agent, or Firm*—Scully, Scott, Murphy & Presser, P.C.

(57) ABSTRACT

A face feature is extracted by a face feature extracting unit, a confidence index is extracted by a confidence index extracting unit, and then, they are outputted as a face meta-data. At a time of matching, by using the confidence index of the face meta-data, a distribution estimating unit estimates the data of a parameter and the like with regard to a posterior distribution when the confidence index is obtained. A distance calculating unit calculates a similarity between feature values. Consequently, the precision of face verification can be improved, thereby carrying out a practical face matching.

33 Claims, 4 Drawing Sheets

U.S. PATENT DOCUMENTS

| | | | |
|---|---|---|---|
| 6,611,613 B1 * | 8/2003 | Kang et al. | 382/118 |
| 6,633,655 B1 * | 10/2003 | Hong et al. | 382/118 |
| 6,681,032 B2 * | 1/2004 | Bortolussi et al. | 382/118 |

FOREIGN PATENT DOCUMENTS

| | | |
|---|---|---|
| JP | 8-249447 | 9/1996 |
| JP | 10-55412 | 2/1998 |
| JP | 10-177650 | 6/1998 |
| JP | 11-306325 | 11/1999 |
| JP | 2000-30065 | 1/2000 |
| JP | 2000-30066 | 1/2000 |
| JP | 2000-99722 | 4/2000 |
| JP | 2000-132675 | 5/2000 |
| JP | 2000-187733 | 7/2000 |
| JP | 2000-306095 | 11/2000 |
| JP | 2001-307096 | 11/2001 |
| JP | 2001-338293 | 12/2001 |

OTHER PUBLICATIONS

Baback Moghaddam et al., "Probabilistic Visual Learning for Object Detection", Proceedings of the Fifth International Conference on Computer Vision, IEEE, Jun. 1995, pp. 786-793.

A. Yamada, et al., "MPEG-7 Visual Part of Experimental Model Version 9.0", ISO/IEC JTCI,SC29/WG11, N3914, 2001.

Baback Moghaddam, "Probabilistic Visual Learning for Object Representation", IEEE Transactions on Pattern Analysis and Machine Intelligence, vol. 19, No. 7, Jul. 1997.

W. Zhao, et al., "Discriminant Analysis of Principal Components for Face Recognition", Proceedings of the IEEE Third International Conference on Automatic Face and Gesture Recognition, pp. 336-3541, 1998.

T. Kamei, "Fingerprint Preselection Using Eigenfeatures", Proceedings of the 1998 IEEE Computer Society Conference on Computer Vision and Pattern Recognition, pp. 918-923, 1998.

C.M. Bishop, "Neural Networks for Pattern Recognition", Oxford University Press, pp. 65-71, 1995.

ISO/IEC PDTR 15938-8, pp. 1-10.

"Transactions on Pattern Analysis and Machine Intelligence",IEEE,Machine Intelligence, 1990, pp. 1194-1202, vol. 12, No. 2.

Akamatsu, Shigeru et al., "An Accurate and Robust Face Identification Scheme", IEEE, 1992, pp. 217-220.

Moghaddam et al., "Efficient MAP/ML Similarity Matching for Visual Recognition", 1998 IEEE, pp. 876-881.

* cited by examiner

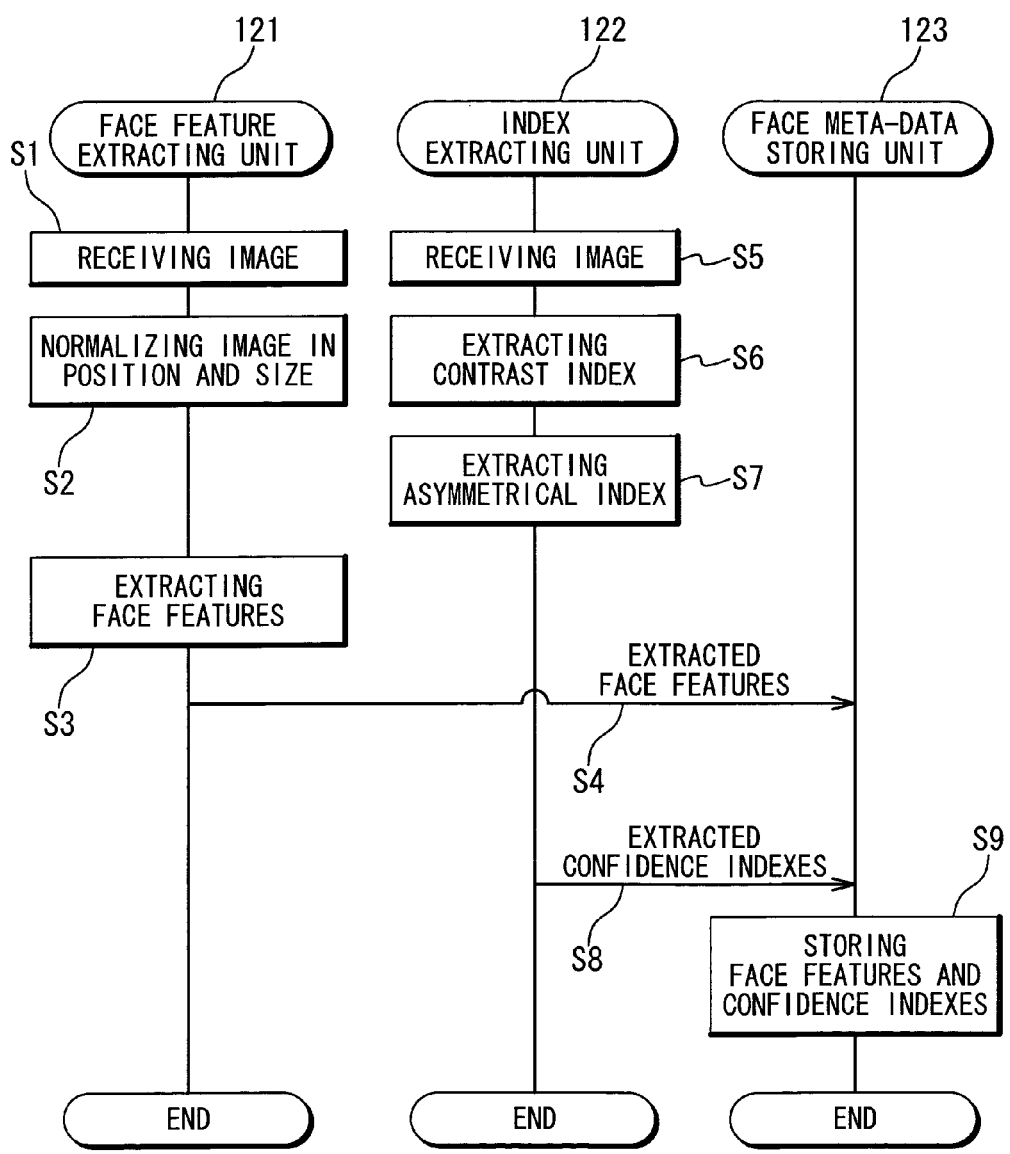

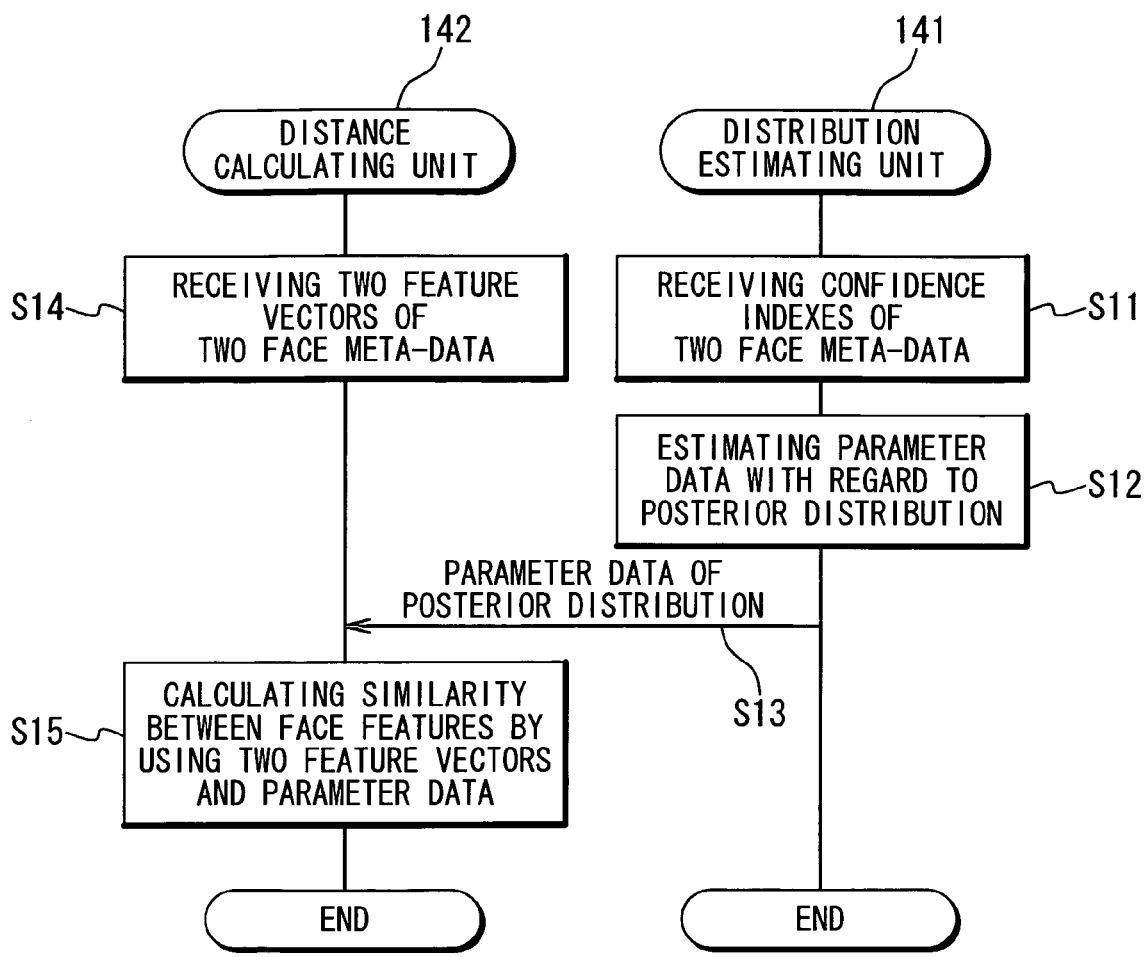

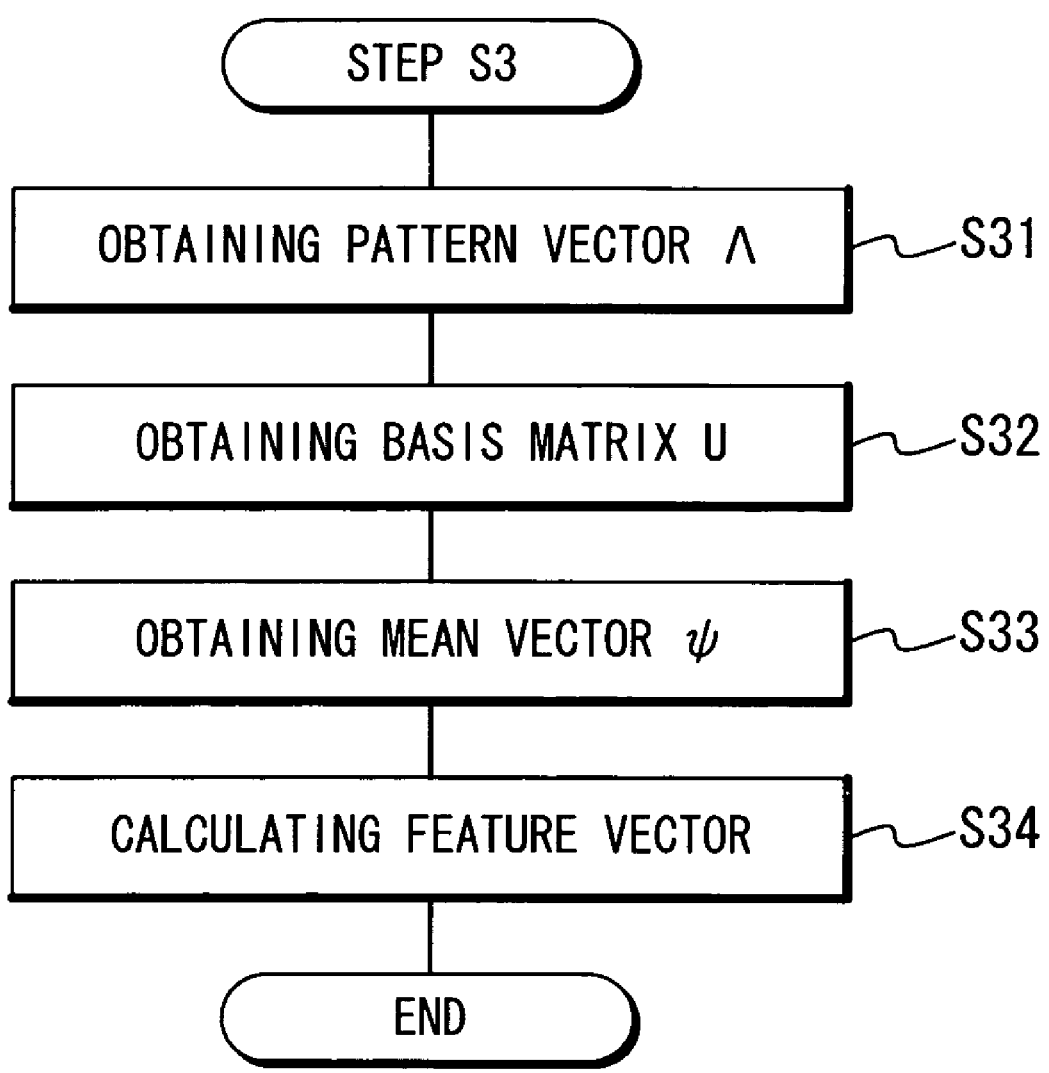

FACE META-DATA GENERATION AND FACE SIMILARITY CALCULATION

TECHNICAL FIELD

The present invention relates to a technique that can be used for a face identification, a face verification, a recognition of a facial expression, a verification between a man and a woman from a face, an age judgment from a face and the like. More particularly, the present invention relates a meta-data generation for generating a meta-data with regard to a face data reflected on a static image or a dynamic image, a face similarity calculation, and a matching technique of a meta-data.

BACKGROUND ART

The meta-data is typically the data describing or representing the meaning of the data, and in the case of the face recognition, it mainly implies the data with regard to the face data of the static image, the dynamic image and the like.

As the standardizing activity of the meta-data for a multimedia content such as a picture, an image, a video, a voice and the like, the activity of MPEG-7 (an international standard for multimedia content description interface standardized by Moving Picture Experts Group) is widely known. As a descriptor of the meta-data with regard to the face recognition in it, a face recognition descriptor is proposed ("MPEG-7 Visual part of experimental Model Version 9.0," A. Yamada et al., ISO/IEC JTC1/SC29/WG11 N3914, 2001).

In this face recognition descriptor, for the face image that is clipped and normalized, a kind of a subspace method typically referred to as an eigen-face is used to determine a basis matrix to extract a feature value of the face image. On the basis of this basis matrix, the face feature is extracted from the image. This is treated as the meta-data. As the similarity to this face feature, it is proposed to use a weighting absolute value distance.

Also, it is known that there are various methods in the technique with regard to the face recognition. For example, a method through the eigen-face based on the principal component analysis or a discriminant analysis and the like are known. The principal component analysis is known, for example, from "Probabilistic Visual Learning for Object Representation", Moghaddam et al., (IEEE Transaction on Pattern Analysis and Machine Intelligence, Vol. 19, No. 7, pp. 696-710, 1997). Also, the discriminant analysis is known, for example, from "Discriminant Analysis of Principal Components for Face Recognition", W. Zhao et al., (Proceedings of the IEEE Third International Conference on Automatic Face and Gesture Recognition, pp. 336-341, 1998).

Also, a method is known for measuring adaptively a distance between patterns by introducing a quality index, when the subspace method is applied to the feature vector obtained from a fingerprint image. For example, there is "Fingerprint Preselection Using Eigenfeatures", T. Kamei and M. Mizoguchi (Proceedings of the 1998 IEEE Computer Society Conference on Computer Vision and Pattern Recognition, pp. 918-923, 1998, Japanese Laid Open Patent Application JP-Heisei 10-177650).

However, the above-mentioned conventional technique can not obtain the sufficient precision of the face recognition.

In relation to the above-mentioned description, a pattern recognizing apparatus that uses a feature selection through a projection of a feature vector to a partial eigen-space is disclosed in Japanese Laid Open Patent Application JP-A-Heisei 10-55412. In order to verify a number of kinds of character patterns, this a conventional example of the pattern recognizing apparatus uses a method of a feature selection, reduces the dimension number of the feature vectors, thereby trying to make a speed of a recognizing process higher, and also uses the feature vector representative of a feature of an input pattern, thereby recognizing the input pattern. An input feature vector extracting unit extracts an input feature vector representative of the feature of the input pattern. A orthonormal basis memory stores a orthonormal basis of the partial eigen-space of an original feature space. A recognition dictionary stores each dictionary selection feature vector defined on the partial eigen-space correspondingly to one or more each recognition target patterns. A feature selecting unit uses the orthonormal basis stored in the orthonormal basis memory, and calculates an input selection feature vector that is the projection to the partial eigen-space of the input feature vector extracted by the input feature vector extracting section. A checking unit checks the input selection feature vector calculated by the feature selecting unit and each dictionary selection feature vector stored in the recognition dictionary, thereby recognizing the kind of the input pattern corresponding to the input selection feature vector.

Also, an object detecting apparatus is disclosed in Japanese Laid Open Patent Application JP-A-Heisei 11-306325. This conventional example of the object detecting apparatus is relatively simple in process and is aimed to accurately detect a verification object. An image input unit inputs an image, and a memory stores a region model in which a plurality of judgment element obtainment regions are set correspondingly to a feature region of a verification object to be detected. A position designating unit sequentially designates a check local region position where the region model stored in the memory is applied to the input image inputted from the image input unit or the image which is inputted in advance from the image input unit and on which an image process is performed. A judgment element obtaining unit obtains a judgment element from each judgment element obtainment region of this region model, each time the region model is sequentially applied to the position designated by this position designating unit. A Mahalanobis distance judging unit carries out a Mahalanobis distance calculation on the basis of the judgment element of each judgment element obtainment region obtained by this judgment element obtaining unit, and carries out the judgment as to whether or not the image of the check local region is the verification object image. Consequently, the detection of the verification object is done on the basis of the judged result by the judging unit.

Also, a face verifying and collating method is disclosed in Japanese Laid Open Patent Application JP-A 2000-132675. This conventional example of the face verifying and collating method is aimed to carry out a stable verification even if two face images to be compared are photographed under different photographing conditions or in different photographing times. In that method, learning is carried out in advance for each class into which the feature of the image variation caused by the difference between the photographing conditions or the photographing times is classified. The class is selected from the difference between the two face images in which at least one of the photographing condition and the photographing time is different, and the feat amounts in which the feat amounts of the image variations in the class selected from the two face images are small are respectively determined, and the face verification and collation are carried out on the basis of the feature values of the two face images. As for the feature of the image variation, a plurality of sample sets of the difference images between the two images in which the photographing conditions or the photographing times are different are prepared, and the principal component analysis is carried out for each class, thereby determining a magnitude of a variance in a sample distribution in each principal component direction and a principal component. In the selection of the cluster of the features of the image variations, the distance between the image of the difference between the input two face images and the space defined by the principal components of the respective classes is calculated, thereby selecting the class in which the calculated distance is the shortest.

Also, an image processing apparatus is disclosed in Japanese Laid Open Patent Application JP-A 2000-187733. This conventional image processing apparatus is aimed so as not to prepare a face oriented toward a left or right direction, or an oblique face or the like, as the sample for the learning. In the image processing apparatus, an image group generating unit generates a symmetrical second reference image group from a first reference image group that is symmetrically placed. A feature information extracting unit extracts feature information by using both of the first reference image group and the second reference image group. A judging unit compares the feature information extracted by the feature information extracting unit with an input image, and judges whether or not the input image is composed of the image of the same pattern as the first reference image group. The first reference image group may be a face image of a human.

DISCLOSURE OF THE INVENTION

Therefore, an object of the present invention is to provide a face meta-data generating technique and a face similarity calculating technique, which can improve a precision of face recognition.

Another object of the present invention is to provide a technique for establishing a further practical face matching system.

According to the present invention, confidence can be extracted from a face image, and a similarity between patterns can be adaptively calculated on the basis of the confidence, thereby improving the precision of the face recognition.

According to a first viewpoint of the present invention, a face meta-data generating apparatus generates a meta-data with regard to a face image section of an image. The face meta-data generating apparatus includes a face feature extracting unit which extracts a face feature from the image, and a confidence index extracting unit which extracts a confidence index indicative of a confidence to the face feature from the image, and generates the face feature and the confidence index as the face meta-data.

The confidence index extracting unit can extract a contrast index of the image, as the confidence index. As the contrast index of the image, a difference between the maximum value and the minimum value of pixel values in the image is extracted. Or, as the contrast index of the image, a standard deviation or a variance of the pixel values in the image is selected.

Moreover, as the confidence index, an asymmetric index of the image may be extracted. As the asymmetric index of the image, the maximum value of differences between the image and an image (hereafter, referred to as a flipped image) which is a mirror image obtained by flipping the left side and the right side of the image is extracted. Or, as the asymmetric index of the image, one of a sum and an average of powers of pixel values of difference image between the image and the flipped image is extracted.

The confidence index extracting unit may include a first confidence index extracting unit which extracts the contrast index of the image, and a second confidence index extracting unit which extracts the asymmetric index of the image. The first confidence index extracting unit extracts a difference between the maximum value and the minimum value of pixel values in the image as the contrast index of the image, and the second confidence index extracting unit extracts the maximum value of differences between the image and the flipped image as the asymmetric index of the image. Or, the first confidence index extracting unit may extract one of a standard deviation and a variance of the pixel values in the image as the contrast index of the image, and the second confidence index extracting unit may extract one of a sum and an average of powers of pixel values of difference images between the image and the flipped image as the asymmetric index of the image.

The face feature extracting unit, when a pattern vector obtained from the image is assumed to be, $\Lambda$ uses a basis matrix U specified by a subset of basis vectors obtained from the principal component analysis of the pattern vector $\Lambda$ and a mean vector $\Psi$ of the pattern vector $\Lambda$, and calculates a feature vector $v=U^T(\Lambda-\Psi)$. In this way, the feature vector v is extracted as the face feature. The basis matrix U is specified by the subset of basis vectors that is selected from basis vectors obtained by the principal component analysis of a training set $[\Lambda]$ of pattern vectors. The basis matrix U can be obtained by the linear combination of: a basis matrix; and a basis matrix specified by a subset of flipped basis vectors which consist of the basis vectors converted so as to correspond to a conversion of pixel values where the left side and the right side of a face image is flipped. The pattern vector $\Lambda$ may be a vector which consists of pixel values of the image, or a vector which consists of Fourier components of the image.

The above-mentioned face similarity calculating apparatus includes: a distribution estimating unit which uses the confidence indexes to face features to be compared, and estimates a parameter data with regard to a posterior distribution of a difference vector between the face features; and a distance calculating unit which calculates, as the similarity, a distance between the facial features obtained from a likelihood of the posterior distribution.

The above-mentioned face similarity calculating apparatus includes: a distribution estimating unit which uses the confidence indexes to face features to be compared, and estimates a parameter data with regard to a posterior distribution of a difference vector between the face features; and a distance calculating unit which calculates, as the similarity, a distance between the facial features obtained from a logarithm likelihood of the posterior distribution.

The distance calculating unit, under assumption that the posterior distribution of the difference vector between the face features is a normal distribution, calculates, as the similarity, an adaptive Mahalanobis distance obtained from the likelihood of the normal distribution according to the confidence index.

The distribution estimating unit estimates a variance $\sigma_{s,k}([\theta_i])^2$ of each element k of the difference vector s to the confidence index $[\theta_i]$, and the distance calculating unit uses the variance $\sigma_{s,k}([\theta_i])^2$ of each element k and calculates the adaptive Mahalanobis distance.

A variance value table for storing in advance the variance $\sigma_{s,k}([\theta_i])^2$ of each element k of the difference vector s to the confidence index $[\theta_i]$ is provided, and the distribution estimating unit refers to the variance value table on the basis of the confidence index $[\theta_i]$, and reads out a variance, and its variance may be used to calculate the adaptive Mahalanobis distance.

The distance calculating unit, when the posterior distribution of the difference vector between the face features is the mixture distribution, calculates as the similarity the adaptive mixture Mahalanobis distance introduced from the likelihood of the mixture distribution in the confidence index.

The confidence index to the face feature to be compared is used to estimate a parameter data with regard to a posterior distribution (a within-class distribution) of the difference vectors between the face features in a class which should be deemed to be coincident, and a posterior distribution (a between-class distribution) of the difference vectors between the face features among classes that should be deemed to be inconsistent is estimated, and the estimated parameter data is used to calculate, as the similarity, a distance between the face features introduced from a likelihood of a ratio between the within-class distribution and the between-class distribution.

When the within-class distribution and the between-class distribution are respectively the normal distributions, the adaptive discriminant distance introduced from the likelihood of the ratio between the respective distributions according to the confidence index is calculated as the similarity.

A within-class variance $\sigma_{W,k}([\theta_i])^2$ and a between-class variance $\sigma_{B,k}([\theta_i])^2$ of each element k of the difference vector s to the confidence index $[\theta_i]$ are estimated, and the adaptive discriminant distance may be calculated as the similarity.

In order to estimate the within-class variance $\sigma_{W,k}([\theta_i])^2$ and the between-class variance $\sigma_{B,k}([\theta_i])^2$ of each element k of the difference vector s to the confidence index $[\theta_i]$, a first variance value table for storing in advance the within-class variance $\sigma_{W,k}([\theta_i])^2$ and a second variance value table for storing in advance the between-class variance $\sigma_{B,k}([\theta_i])^2$ are provided, and on the basis of the confidence index $[\theta_i]$, the first and second variance value tables are respectively referred to read out the variance, and the read out variance may be used to calculate the adaptive discriminant distance.

When the within-class distribution and the between-class distribution are respectively, the mixture distributions, the adaptive mixture discriminant distance may be calculated as the similarity, from the likelihood of the ratio between the respective mixture distributions in the confidence index.

According to the third viewpoint of the present invention, a face recognizing system includes an image input unit which inputs images and a face image database unit which stores face images. The face recognizing system includes: a face meta-data generating unit which generates a face feature extracted from the image and a confidence index face representative of a confidence to the face feature as a face meta-data; a face meta-data storing unit which stores the face meta-data generated by the face meta-data generating unit; a face similarity calculating unit which calculates a face similarity on the basis of the face feature and the confidence indexes representative of the confidence to the face feature; and a control unit which controls the face meta-data generating unit, the face meta-data storing unit and the face similarity calculating unit, and executes a matching of the face images in response to an input command.

The usage of the above-mentioned face meta-data generating unit and face similarity calculating unit enables the achievement of the face image matching of the high precision.

BRIEF DESCRIPTION OF DRAWING

FIG. 2 is a flowchart showing an operation of the embodiment of the face meta-data generating method according to the present invention;

FIG. 3 is a flowchart showing an operation of the embodiment of the face similarity calculating method according to the present invention; and FIG. 4 is a flowchart showing the step S3.

Figure 1:
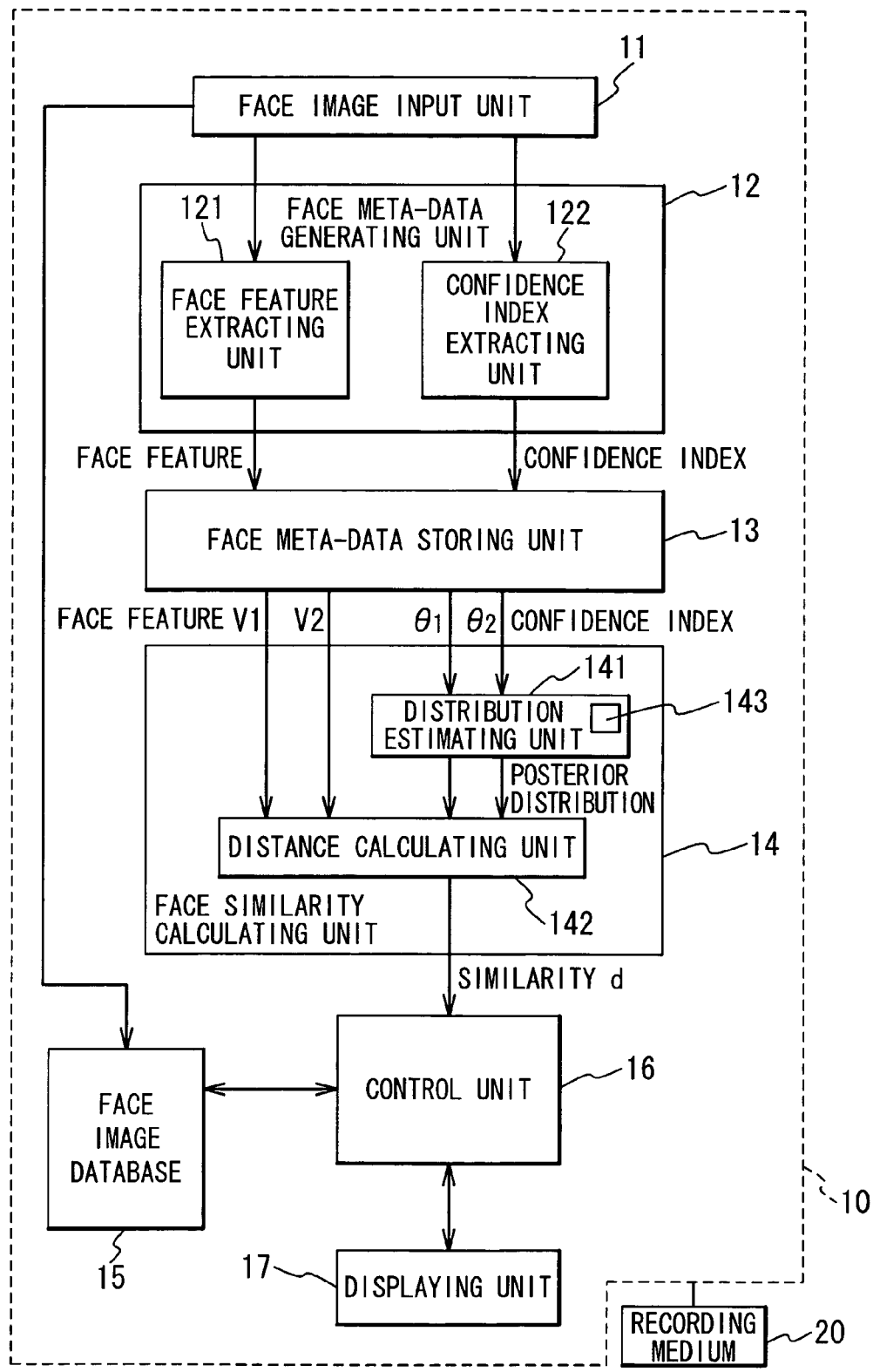
FIG. 1 is a block diagram showing a configuration of a face image matching system according to an embodiment of the present invention.

BEST MODE OF CARRYING OUT THE INVENTION (Principle of Invention)

At first, the principle of the present invention is explained. Typically, when pattern recognition is done, if a large quantity of training data can be prepared for a class to be recognized, a distribution function of a pattern can be estimated on the basis of a statistic analysis for the training data, thereby establishing a pattern recognizing mechanism. However, in many cases of face recognition applications, only a few registration images can be obtained for each person. Let us suppose that even in such a case, an index of a confidence is given to a feature vector of a face, and the class is considered on the basis of the index. Consequently, the statistic analysis of the class for the confidence index is carried out, and the distribution function of the pattern is estimated, and even for the face recognition in which only one registration image can be obtained, it is possible to establish the pattern recognizing mechanism based on the distribution function through the confidence index.

The principle of the face recognition will be described below with regard to a Mahalanobis distance and a discriminant distance based on a within-class distribution and a between-class distribution in a case based on an error distribution.

Suppose that a feature vector v be obtained from the face of a person. The feature vector v (observation vector v) can be represented by the following equation (1) using a real feature vector $v_0$ and an observation error vector $\epsilon$.

$$v = v_0 + \epsilon \quad (1)$$

Here, if the feature vector $v_0$ is observed two times, as shown in the following equation (2), two observation vectors $v_1$ and $v_2$ are expressed using the two error vectors $\epsilon_1$ and $\epsilon_2$ according to the difference of the observation conditions.

$$v_1 = v_0 + \epsilon_1$$

$$v_2 = v_0 + \epsilon_2 \quad (2)$$

Now, let us suppose that a confidence index $\theta_1$ and a confidence index $\theta_2$ having relations with the error vector $\epsilon_1$ and the error vector $\epsilon_2$ are respectively obtained and that the posterior distributions are $p(\epsilon|\theta_1)$, $p(\epsilon|\theta_2)$ respectively. When a posterior distribution of a difference vector s between observation vectors $v_1$ and $v_2$ under observation of the confidence indexes $\theta_1$, $\theta_2$ is represented as $p(s|\theta_1, \theta_2)$, a similarity $d(v_1, v_2)$ between feature vectors can be represented by a logarithm likelihood of the posterior distribution as the following equation (3).

$$d(v_1, v_2) = -\ln p(s|\theta_1, \theta_2) \quad (3)$$

If the posterior distributions $p(\epsilon|\theta_1)$, $p(\epsilon|\theta_2)$ are respectively assumed to be normal distributions, the distribution $p(s|\theta_1,\theta_2)$ of the difference vector s becomes also the normal distribution. Here, when the posterior distribution of the error vector is assumed to be $p(\epsilon|\theta_i)$ (i=1,2), let us consider a normal distribution of a covariance matrix $\Sigma_\epsilon(\theta_i)$ and zero mean. In this case, with regard to the distribution of the difference vector s, the mean is 0, and the covariance matrix $\Sigma_s(\theta_1, \theta_2)$ is represented by the equation (4).

$$\Sigma_s(\theta_1, \theta_2) = \Sigma_\epsilon(\theta_1) + \Sigma_\epsilon(\theta_2) \quad (4)$$

When it is re-written, the posterior distribution $p(\epsilon|\theta_1, \theta_2)$ is represented by the following equation (5).

$$p(s|\theta_1, \theta_2) = \frac{1}{(2\pi)^{\frac{N}{2}} \left|\sum_s (\theta_1, \theta_2)\right|^{\frac{1}{2}}} \exp\left(-\frac{1}{2} s^T \sum_s (\theta_1, \theta_2)^{-1} s\right) \quad (5)$$

Thus, the equation (3) can be represented as the adaptive Mahalanobis distances to the confidence indexes $\theta_1$, $\theta_2$ by using the covariance matrixes $\Sigma_\epsilon(\theta_1)$, $\Sigma_\epsilon(\theta_2)$ as shown in the following equation (6).

$$d(v_1, v_2) = -\ln p(s|\theta_1, \theta_2) \quad (6)$$

$$= \frac{1}{2} s^T \sum_s (\theta_1, \theta_2)^{-1} s + \frac{1}{2} \ln(2\pi)^N \left|\sum_s (\theta_1, \theta_2)\right|$$

$$= \frac{1}{2} s^T \left(\sum_\epsilon (\theta_1) + \sum_\epsilon (\theta_2)\right)^{-1} s + \frac{1}{2} \ln(2\pi)^N \left|\sum_\epsilon (\theta_1) + \sum_\epsilon (\theta_2)\right|$$

If the independence between the respective elements of the error vector is assumed, the equation (5) is represented by the following equation (7).

$$p(s|\theta_1, \theta_2) = \prod_{k=1}^{N} \frac{1}{\sqrt{2\pi}\, \sigma_{s,k}(\theta_1, \theta_2)} \exp\left(\frac{s_k^2}{2\sigma_{s,k}(\theta_1, \theta_2)}\right) \quad (7)$$

Here, $\sigma_{s,k}(\theta_1, \theta_2)^2$ is the k-th diagonal element of the covariance matrix $\Sigma_s(\theta_1, \theta_2)$, in short, the variance of the observation error. Also, $\sigma_{\epsilon,k}(\theta_1)^2$, $\sigma_{\epsilon,k}(\theta_2)^2$ are the k-th diagonal elements of the covariance matrixes $\Sigma_\epsilon(\theta_1)$, $\Sigma_\epsilon(\theta_2)$, respectively. $s_k$ designates the k-th element of the difference vector s.

Since the normal distribution is assumed as mentioned above, the equation (3) can define the similarity from the adaptive Mahalanobis distance for the confidence indexes $\theta_1, \theta_2$, by using the variances $\sigma_{\epsilon,k}(\theta_1)$, $\sigma_{\epsilon,k}(\theta_2)$ for each element of each feature vector, as shown in the following equation (8).

$$d(v_1, v_2) = -\ln p(s|\theta_1, \theta_2) \quad (8)$$

$$= \frac{1}{2} \sum_{k=1}^{N} \left(\frac{s_k^2}{\sigma_{s,k}(\theta_1, \theta_2)^2}\right) + \frac{1}{2} \sum_{k=1}^{N} \ln 2\pi \sigma_{s,k}(\theta_1, \theta_2)^2$$

$$= \frac{1}{2} \sum_{k=1}^{N} \frac{(v_{1,k} - v_{2,k})^2}{\sigma_{s,k}(\theta_1)^2 + \sigma_{s,k}(\theta_2)^2} + \frac{1}{2} \sum_{k=1}^{N} \ln 2\pi (\sigma_{s,k}(\theta_1)^2 + \sigma_{s,k}(\theta_2)^2)$$

Here, $v_{1,k}$, $v_{2,k}$ represent the k-th elements of the feature vectors $v_1$, $v_2$, respectively.

In the above-mentioned explanation, although the normal distribution is assumed to be the posterior distribution $p(s|\theta_1, \theta_2)$, a mixture normal distribution is assumed in the following explanation. As shown in the following equation (9), let us suppose that the posterior distribution $p(s|\theta_1, \theta_2)$ can be represented by the sum of the normal distributions $p(s|\theta_1, \theta_2, j)$ (j=1,2,..., M).

$$p(s|\theta_1, \theta_2) = \sum_{j=1}^{M} p(s|\theta_1, \theta_2, j) p(j) \quad (9)$$

Thus, the adaptive mixture Mahalanobis distance can be defined by the following equation (10).

$$d(v_1, v_2) = -\ln \sum_{j=1}^{M} p(s|\theta_1, \theta_2, j) p(j) \quad (10)$$

$$= -\ln \sum_{j=1}^{M} \frac{1}{(2\pi)^{\frac{N}{2}} \left|\sum_s (\theta_1, \theta_2, j)\right|^{\frac{1}{2}}} \exp\left(-\frac{1}{2} s^T \sum_s (\theta_1, \theta_2, j)^{-1} s\right) p(j)$$

$$= -\ln \sum_{j=1}^{M} \frac{1}{(2\pi)^{\frac{N}{2}} \left|\sum_\epsilon (\theta_1, j) + \sum_\epsilon (\theta_2, j)\right|^{\frac{1}{2}}} \times$$

$$\exp\left(-\frac{1}{2} s^T \left(\sum_\epsilon (\theta_1, j) + \sum_\epsilon (\theta_2, j)\right)^{-1} s\right) p(j)$$

The estimation of the covariance matrixes $\Sigma_s(\theta_1, \theta_2, j)$ of the posterior distributions $p(s|\theta_1, \theta_2, j)$ and $p(j)$ can be estimated by using the EM algorithm and the maximum likelihood method that are a typical estimating method. Those details are noted in "Neural Networks for Pattern Recognition", C. M. Bishop, (Oxford University Express, 1995).

The assumption of the mixture normal distribution enables the distribution to be further accurately approximated, and enables the improvement of a matching performance. However, a large quantity of training data is required, and an operation amount is also greatly increased.

The Mahalanobis distance based on the above-mentioned error distribution is the distance that is superior in the problem such as the face identification for examining the closest face data in the other registered face data to the retrieved face data. On the other hand, the distance referred to as "discriminant distance" be explained below is a better similarity measure than the above-mentioned Mahalanobis distance in face verification. In the face verification problem, it is important whether the input face data should be accepted or rejected in judging the identity between the input face data and the registered face data.

Now, if the two feature vectors v belong to the same category and coincide, namely, for example, if the two feature vectors are extracted from the face of the same person, it is determined that the combination of those feature vectors belongs to a class W. Also, if the two feature vectors v come from the different categories, namely, if the two feature vectors are extracted from the face of different persons, it is determined that the combination belongs to a class B.

Let us suppose that the confidence indexes $\theta_1$, $\theta_2$ are obtained for the two feature vectors $v_1$, $v_2$. When the difference vector s and the two confidence indexes $\theta_1$, $\theta_2$ (hereafter, the set of the two confidence indexes is noted as $[\theta_1]$) are observed, the discriminant problem between the case when the two feature vectors $v_1$, $v_2$ are deemed coincident and the case when they are deemed inconsistent is considered. In this case, a decision rule of the following equation (11) is obtained.

$$\frac{p(W \mid s, \{\theta_i\})}{p(B \mid s, \{\theta_i\})} > 1: \text{coincidence} \qquad (11)$$

$$\frac{p(W \mid s, \{\theta_i\})}{p(B \mid s, \{\theta_i\})} > 1: \text{incoincidence}$$

The left side of the above-mentioned equation (11) can be re-written such as the following equation (12) from the Bays Theorem.

$$\frac{p(W \mid s, \{\theta_i\})}{p(B \mid s, \{\theta_i\})} = \frac{\frac{p(W, \{\theta_i\})p(s \mid W, \{\theta_i\})}{p(s, \{\theta_i\})}}{\frac{p(B, \{\theta_i\})p(s \mid B, \{\theta_i\})}{p(s, \{\theta_i\})}} \qquad (12)$$

$$= \frac{p(W, \{\theta_i\})p(s \mid W, \{\theta_i\})}{p(B, \{\theta_i\})p(s \mid B, \{\theta_i\})}$$

Here, let us suppose that the probabilities of the occurrences of the classes W, B and $\{\theta_i\}$ are independent, and p(W, $\{\theta_i\}$)=p(W)p($\{\theta_i\}$), and p(B, $\{\theta_i\}$)=p(B)p($\{\theta_i\}$).

If the likelihood of the equation (12) is calculated as the distance $d(v_1, v_2)$ between the feature vectors, the similarity suitable for the face verification problem can be obtained, as represented by the following equation (13).

$$d(v_1, v_2) = -\ln \frac{p(W)p(s \mid W, \{\theta_i\})}{p(B)p(s \mid B, \{\theta_i\})} \qquad (13)$$

$$= -\ln \frac{p(s \mid W, \{\theta_i\})}{p(s \mid B, \{\theta_i\})} - \ln \frac{p(W)}{p(B)}$$

If prior probabilities P(W), P(B) are different for each individual matching, and if they can be known, the second item of the equation (13) is desired to be calculated. However, in many cases, since the prior probability can not be known for each individual matching, the prior probability is assumed to be constant, thereby deeming the second item constant, and removing from the calculation of the similarity.

When the posterior distributions p(s|W, $\{\theta_i\}$), p(s|B, $\{\theta_i\}$) are written as a within-class distribution $p_W(s \mid \{\theta_i\})$ and an between-class distribution $p_B(s \mid \{\theta_i\})$, respectively, the following equation (14) can be obtained.

$$d(v_1, v_2) = -\ln \frac{p_W(s \mid \{\theta_i\})}{p_B(s \mid \{\theta_i\})} - \ln \frac{p(W)}{p(B)} \qquad (14)$$

Next, if the within-class distribution $p_W(s \mid \{\theta_i\})$ and the between-class distribution $p_B(s \mid \{\theta_i\})$ are respectively assumed to be the normal distributions of zero-mean and covariance matrixes $\Sigma_W(\{\theta_i\})$, $\Sigma_B(\{\theta_i\})$, respectively, the posterior distributions can be represented by the following equation (15), respectively.

$$p_W(s \mid \{\theta_i\}) = \frac{1}{(2\pi)^{\frac{N}{2}} \left|\sum_W(\{\theta_i\})\right|^{\frac{1}{2}}} \exp\left(-\frac{1}{2} s^T \sum_W (\{\theta_i\})^{-1} s\right) \qquad (15)$$

$$p_B(s \mid \{\theta_i\}) = \frac{1}{(2\pi)^{\frac{N}{2}} \left|\sum_B(\{\theta_i\})\right|^{\frac{1}{2}}} \exp\left(-\frac{1}{2} s^T \sum_B (\{\theta_i\})^{-1} s\right)$$

When the above-mentioned equation is substituted for the equation (14) (here, the second item of the equation (14) is omitted), the distance indicated in the following equation (16) can be obtained. This is referred to as [Adaptive Discriminant Distance].

$$d(v_1, v_2) = -\ln \frac{p_W(s \mid \{\theta_i\})}{p_B(s \mid \{\theta_i\})} \qquad (16)$$

$$= \frac{1}{2} s^T \left( \sum_W (\{\theta_i\})^{-1} - \sum_B (\{\theta_i\})^{-1} \right) s +$$

$$\frac{1}{2} \left( \ln \left|\sum_W (\{\theta_i\})\right| - \ln \left|\sum_B (\{\theta_i\})\right| \right)$$

If the independence among the respective elements of the difference vector s is assumed, the equation (15) can be represented as the following equation (17).

$$p_W(s \mid \{\theta_i\}) = \prod_{k=1}^{N} \frac{1}{\sqrt{2\pi} \, \sigma_{W,k}(\{\theta_i\})} \exp\left(-\frac{s_k^2}{2\sigma_{W,k}(\{\theta_i\})^2}\right) \qquad (17)$$

$$p_B(s \mid \{\theta_i\}) = \prod_{k=1}^{N} \frac{1}{\sqrt{2\pi} \, \sigma_{B,k}(\{\theta_i\})} \exp\left(-\frac{s_k^2}{2\sigma_{B,k}(\{\theta_i\})^2}\right)$$

Here, $\sigma_{W,k}(\theta_i)^2$, $\sigma_{B,k}(\theta_i)^2$ are the k-th diagonal elements of the covariance matrixes $\Sigma_W(\theta_i)$, $\Sigma_B(\theta_i)$, respectively, and in short, correspond to a within-class variance and an between-class variance. $s_k$ is the k-th element of the difference vector s.

Since the normal distribution is assumed as mentioned above, the equation (16) can define the similarity from the adaptive discriminant distance for the confidence index $\{\theta_i\}$, by using the within-class variance $\sigma_{W,k}(\theta_i)^2$ and the between-class distribution $\sigma_{B,k}(\theta_i)^2$ of each element of each feature vector, as shown in the following equation (18).

$$d(v_1, v_2) = -\ln \frac{p_W(s \mid \{\theta_i\})}{p_B(s \mid \{\theta_i\})} \qquad (18)$$

$$= \frac{1}{2} \sum_{k=1}^{N} \left( \frac{1}{\sigma_{W,k}(\{\theta_i\})^2} - \frac{1}{\sigma_{B,k}(\{\theta_i\})^2} \right) s_k^2 +$$

$$\sum_{k=1}^{N} (\ln 2\pi \sigma_{W,k}(\{\theta_i\})^2 - \ln 2\pi \sigma_{B,k}(\{\theta_i\})^2)$$

In the above-mentioned explanation, although the normal distributions are assumed to be the within-class variance $\sigma_{W,k}(\theta_i)^2$ and the between-class distribution $\sigma_{B,k}(\theta_i)^2$, hereafter, a mixture distribution is assumed.

As shown in the following equation (19), as the within-class distribution $p_W(s|[_i])$ and the between-class distribution $p_B(s|[\theta_i])$, let us suppose that the posterior distribution can be represented by the sum of the normal distributions $p_W(s|[\theta_i], j_W)$ ($j_W=1,2,\ldots,M_W$), $p_B(s|[\theta_i], j_B)$ ($j_B=1,2,\ldots,M_B$).

$$p_W(s|\{\theta_i\}) = \sum_{j_W=1}^{M_W} p_W(s|\{\theta_i\}, j_W) p(j_W) \quad (19)$$

$$p_B(s|\{\theta_i\}) = \sum_{j_B=1}^{M_B} p_B(s|\{\theta_i\}, j_B) p(j_B)$$

Thus, this logarithm likelihood can be used to introduce the adaptive mixture Mahalanobis distance of the following equation (20).

$$d(v_1, v_2) = -\ln \frac{p_W(s|\{\theta_i\})}{p_B(s|\{\theta_i\})} \quad (20)$$

$$= -\ln \sum_{j_W=1}^{M_W} p_W(s|\{\theta_i\}, j_W) p(j_W) +$$

$$\ln \sum_{j_B=1}^{M_B} p_B(s|\{\theta_i\}, j_B) p(j_B)$$

$$= -\ln \sum_{j_W=1}^{M_W} \frac{1}{(2\pi)^{\frac{N}{2}} \left|\sum_W (\{\theta_i\}, j_W)\right|^{\frac{1}{2}}} \exp\left(-\frac{1}{2} s^T \sum_W (\{\theta_i\},$$

$$j_W)^{-1} s\right) p(j_W) + \ln \sum_{j_B=1}^{M_B} \frac{1}{(2\pi)^{\frac{N}{2}} \left|\sum_B (\{\theta_i\}, j_B)\right|^{\frac{1}{2}}} \exp\left(-\frac{1}{2} s^T \sum_B (\{\theta_i\}, j_B)^{-1} s\right) p$$

The estimation of the covariance matrixes $\Sigma_W(s|[\theta_i], j_W)$, $\Sigma_B(s|[\theta_i], j_B)$ and $p(j_W)$, $p(j_B)$ of the within-class distribution $p_W(s|[\theta_i], j_W)$ and the between-class distribution $p_B(s|[\theta_i], j_B)$ can be estimated by using the maximum likelihood method and the EM algorithm.

The estimation of the mixture distribution enables the distribution to be further accurately approximated, and improve the matching performance. However, the large quantity of training data is required, and the operation cost is also greatly increased.

By further extracting the confidence index for the face feature as mentioned above, the adaptive distance model can be introduced for the confidence index so that the face recognizing mechanism of a high precision can be established. Incidentally, in the above-mentioned description, although the confidence index for the feature vector is not specified as a scalar (consisting of only one component) or a vector (consisting of multiple components), the discussion can be attained in both of the cases, and the multiple elements can be used to expect the improvement of the performance.

As for the specific confidence index, it is necessary to discover the effective confidence index. In the case of the face recognition, the high effect can be obtained by using a contrast index representative of a contrast of an image. In the case of the front face recognition, the high effect can be obtained by using and an asymmetric index representative of the symmetry distortion of a face image induced by an illumination variation and a pose variation. The further improvement of the precision can be achieved by combining those confidence indexes of the vector.

EMBODIMENT

FIG. 1 is a block diagram showing a face image matching system according to an embodiment of the present invention. The face image matching system will be described below in detail.

As shown in FIG. 1, the face image matching system according to the present invention is provided with a face image input unit 11, a face meta-data generating unit 12, a face meta-data storing unit 13, a face similarity calculating unit 14, a face image database 15, a control unit 16 and a displaying unit 17. The face image input unit 11 inputs a face image, and the face meta-data generating unit 12 extracts the face feature and the confidence index from the input face image, and generates a face meta-data. The face meta-data storing unit 13 stores (accumulates) the extracted face meta-data. The face similarity calculating unit 14 calculates the similarity of faces from two face meta-data. The face image database 15 stores the face images. The control unit 16 carries out the controls for the input of the image, the generating of the meta-data, the storing of the meta-data and the calculating of the face similarity in response to a registration request and a retrieval request of the image. The displaying unit 17 displays the face image and the other data.

Also, the face meta-data generating unit 12 is composed of a face feature extracting unit 121 for extracting a face feature from the input face image, and a confidence index extracting unit 122 for extracting a confidence index from the face image. The face similarity calculating unit 14 is composed of a distribution estimating unit 141 for estimating a parameter data with regard to a posterior distribution from the confidence index, and a distance calculating unit 142 for calculating a distance between the face features from a posterior distribution data from the distribution estimating unit 141 and the face feature. Inside the distribution estimating unit 141, a variance value table 143 for storing a variance value is desired to be prepared. The variance value stored in the variance value table 143 is desired to be calculated in advance and stored in the table 143.

At a time of a registration, the image input unit 11 inputs a face photograph from a scanner or a vide camera after adjusting a size and a position of a face. Or, the face of a person may be directly inputted from the video camera and the like. In this case, the face detecting technique as indicated in the document of the above-mentioned Moghaddam may be used to detect a face position of the input image and automatically normalize the size of the face image and the like.

Also, the input face image is related with a face meta-data or an ID, as necessary, and registered in the face image database 15. Simultaneously with a face image registration, the face meta-data is generated by the face meta-data generating unit 12 and stored in the face meta-data storing unit 13.

At a time of a retrieval, similarly, the face image is inputted from the face image input unit 11, and the face meta-data is generated by the face meta-data generating unit 12. The generated face meta-data is once registered in the face meta-data storing unit 13 or directly sent to the face similarity calculating unit 14. In the retrieval, in the case of the face identification, namely, if it is checked whether or not the preliminarily input face image is stored in the database, the similarity to each of the data registered in the face meta-data storing unit 13 is calculated. On the basis of the face meta-data or the ID corresponding to the result of the highest similarity, namely, the result of the smallest distance value, the control unit 16 selects the face image from the face image database 15, and controls the displaying unit 17 so as to display the face image. A worker checks the identity of the face in the retrieval image and the registration image.

On the other hand, in the case of a face verification, namely, if it is checked whether or not the face image preliminarily specified on the basis of the ID number and the face image of the retrieval are coincident, the face similarity calculating unit 14 calculates whether or not it is coincident with the face image of the specified ID number. If the similarity is lower than a predetermined similarity, namely, the distance value is greater, it is judged to be inconsistent, and if the similarity is higher, it is judged to be coincident. The control unit 16 controls the displaying unit 17 so as to display that result.

If this system is used for a room entry management, instead of the displaying of the face similarity, the control unit 16 enables the automatic door to be controlled for the room entry management by sending the open/close control signal to an automatic door.

Although the face image matching system is operated as mentioned above, such an operation can be also attained on a computer system. For example, as detailed below, a meta-data generating program for executing a meta-data generation and a similarity calculating program for executing a similarity calculation are stored in a recording medium 20, and it is read out to store in a memory (not shown), and they are respectively executed by a program control processor (not shown). Consequently, the face image matching system can be attained.

The operation of this face image matching system, especially, the face meta-data generating unit 12 and the face similarity calculating unit 14 will be explained below in detail.

(1) Face Meta-Data Generation

FIG. 2 is a flowchart showing an operation of the embodiment of the face meta-data generating method according to the present invention.

The face feature extracting unit 121 of the face meta-data generating unit 12 receives an (face) image I(x,y) (step S1). The face meta-data generating unit 12 uses an image I(x,y) in which a position and a size are normalized, (step S2), and extracts face features (step S3). The extracted face features are outputted to the face meta-data storing unit 13 (step S4). As for the normalization of the position and the size, the image may be normalized, for example, in such a way that an eye position is (16,24), (31,24) and a size has 46×56 pixels. Hereafter, the case when the image is normalized to this size is explained.

As the face feature, a so-called eigen-face method (the paper of the above-mentioned Moghaddam) is used to extract the feature in the step S3. FIG. 4 is a flow chart showing the step S3. In short, the face feature extracting unit 121 obtains a pattern vector Λ (step S31) a basis matrix U (step S32) and an mean face Ψ (step S33) Λ are used to calculate a feature vector v=U$^T$(Λ−Ψ) (step S34). The dimensionality of the feature vector becomes 48. The pattern vector Λ consists of pixels values of the input image. The dimensionality of the pattern vector becomes 2576(=46×56). The basis matrix U is specified by a subset of basis vectors obtained by the principal component analysis of pattern vectors. In case that 48 basis vectors are selected, the basis matrix U is a matrix which consists of 48 columns and 2576 rows. The dimensionality of the feature vector becomes 48. The mean face Ψ is a mean vector of pattern vectors. In this way, the input image is not used, and the subset of basis vectors is used to reduce the data size of the input image. In this way, the reduction of the data size is important not only to reduce the storage size of the meta-database, but also to attain the high speed matching.

In this way, other than the generally used eigen-face method, the method that is a combination between the discriminant analysis and the principal component analysis (the paper of the above-mentioned W. Zhao) may be used specify the subset of basis vectors.

Also, in the step S32 the face feature may be extracted by using a matrix U (=aU$_n$+bU$_m$) as the basis matrix, which is obtained by a linear combination of a basis matrix U$_n$ and a basis matrix U$_m$. Here, the basis matrix U$_n$ is specified by a subset of basis vector selected from the basis vectors obtained by the discriminant analysis or the principal component analysis as mentioned above. Also, the basis matrix U$_m$ is specified by a subset of flipped basis vectors, in which the element of the basis vector is exchanged so as to correspond to the conversion of the pixel values in which the face image is flipped between the left and the right. For example, supposing that a=b=1, as for the obtained feature vector, only the component symmetrical with respect to the conversion between the left and the right can be extracted in an input image space. Since the face is originally symmetrical, the image component, which is made asymmetrical by the influence of illumination, and the asymmetrical component induced since the orientation of the face do not face a front, originally corresponds to noise. Hence, by removing this and extracting only the symmetrical component, the extracted face feature becomes stable to the variation of the illumination and the pose.

Also, in the step S3 the image may be transformed by Fourier transformation, and the vector which consists of the amplitude of the respective components of the obtained complex Fourier-components as the elements may be calculated as the pattern vector Λ, and the face feature may be extracted using the pattern vector Λ. In this way, by Fourier transformation for the image, the face feature strong for position displacement can be extracted. In this way, the face feature extracting unit 121 extracts the face feature v.

As shown in FIG. 2, the confidence index extracting unit 122 of the face meta-data generating unit 12 receives an image I(x,y) (step S5). The confidence index extracting unit 122 extracts a contrast index θ$_{contrast}$ (step S6) and an asymmetrical index θ$_{asymmetric}$ (step S7) effective as the confidence index of the face feature v. The extracted confidence indexes are outputted to the face meta-data storing unit 13 (step S8). The face meta-data storing unit 13 stores the face features and the confidence indexes (step S9). As the contrast index θ$_{contrast}$, a standard deviation of the pixel value in the face image I(x,y) is calculated by the following equation (21).

$$\theta_{contrast} = \text{round}\left(\frac{15}{128}\sqrt{\frac{1}{46\times56}\sum_{i=1}^{46}\sum_{j=1}^{56}(I(i,j)-\bar{I})}\right) \quad (21)$$

$$\bar{I} = \frac{1}{46\times56}\sum_{i=1}^{46}\sum_{j=1}^{56}I(i,j)$$

Here, the round ( ) denotes the rounding process of the numeral values. The extracted contrast index θ$_{contrast}$ is clipped in a range of 4 bit integer, that is, [0, 1, 2, . . . , 15]. In the above-mentioned description, although the standard deviation of the image is used as the contrast index, the variance and the difference between the maximum value and the minimum value of the pixel values in the image may be extracted.

As the asymmetrical index $\theta_{asymmetric}$, the average of absolute values (the first power) of differences between the face image I(x,y) and its flipped face image is extracted by the following equation (22).

$$\theta_{asymmetric} = \text{round}\left(\frac{15}{128}\frac{1}{46\times 56}\sum_{i=1}^{46}\sum_{j=1}^{56}|I(i,j)-I(47-i,j)|\right) \quad (22)$$

The extracted confidence index $\theta_{asymmetric}$ is clipped in the range of 4 bit integer, that is [0, 1, 2, ..., 15]. Although, in the above-mentioned case, the mean (of the first power) of the absolute difference (MAD) of the image is used as the asymmetric index, the mean of the square difference (MSD) may be used. Also, instead of the mean [the sum] of the absolute difference and the mean of the square difference, the sum of the absolute difference and the sum of the square difference, can also be used. Also, if the maximum value of the differences is detected to use its value as the asymmetric index, the operation cost becomes small.

The confidence index extracting unit 122 extracts the feature vector v, the confidence index $\theta_{contrast}$ and the confidence index $\theta_{asymmetric}$ for the face image, and outputs as the face meta-data. As mentioned above, the computer program can instruct the computer to execute the above-mentioned face meta-data generating procedure.

(2) Face Similarity Calculation

FIG. 3 is a flowchart showing an operation of the embodiment of the face similarity calculating method according to the present invention. Next, the operation of the face similarity calculating unit 14 will be described below. In the face similarity calculating unit 14, the distribution estimating unit 141 receives the confidence indexes $\theta_{contrast,1}$, $\theta_{contrast,2}$, $\theta_{asymmetric,1}$ and $\theta_{asymmetric,2}$ of the two face meta-data from the face meta-data generating unit 12 or the face meta-data storing unit 13 (step S11). By using the confidence indexes $\theta_{contrast,1}$, $\theta_{contrast,2}$, $\theta_{asymmetric,1}$ and $\theta_{asymmetric,2}$ of the two face meta-data from the face meta-data, the distribution estimating unit 141 estimates the parameter data with regard to the posterior distribution (step S12). The parameter data with regard to the posterior distribution are outputted to the distance calculating unit 142 (step S13). The distance calculating unit 142 receives the two vectors $v_1$, $v_2$ of the two face meta-data (step S14). By using the two feature vectors $v_1$, $v_2$ of the two face meta-data and the parameter data with regard to the posterior distribution the distance calculating unit 142 calculates a similarity d between the face features (step S15).

Here, the case when the similarity of the face is calculated by using the equation (8) or the equation (18) is explained.

The confidence indexes $\theta_1$, $\theta_2$ represented in the equation (8) or the equation (18) are the vectors in this embodiment, and the respective elements are $\theta_1 = (\theta_{contrast,1}, \theta_{asymmetric,1})^T$, $\theta_2 = (\theta_{contrast,2}, \theta_{asymmetric,2})^T$. Since the contrast indexes and the asymmetric indexes are represented as 4 bit, respectively, the states at which the $\theta_i$ can be set are 256 states. One state among the 256 states can be specified by the given confidence index $\theta_i$.

The distribution estimating unit 141 stores in the table (such as the variance value table 143) the variance value $\sigma_{\epsilon,k}(\theta)$, the variance value $\sigma_{W,k}(\theta)$ and the variance value $\sigma_{B,k}(\theta)$ of the difference vector with respect to the preliminarily obtained confidence indexes è (having the 256 states), as described later, and by using the confidence indexes, $\theta_1$, $\theta_2$ and referring to the values of the respective variance value tables obtains the variance values as the posterior distribution data (step S12). The distribution estimating unit 141 passes the obtained variance values as the posterior distribution data to the distance calculating unit 142 (step S13). In the case of the face identification, the values of the variance value $\sigma_{\epsilon,k}(\theta_1)$ and the variance value $\sigma_{\epsilon,k}(\theta_2)$ needed in the equation (8) may be outputted to the distance calculating unit 142. In the case of the face verification, the variance value $\sigma_{W,k}(\theta)$, and the variance value $\sigma_{B,k}(\theta)$ needed in the equation (18) are outputted.

The distance calculating unit 142 receives the two feature vectors $v_1$, $v_2$ (step S14) and calculates the adaptive Mahalanobis distance or the adaptive discriminant distance in accordance with the equation (8) or the equation (18), and outputs as the similarity d (step S15).

The variance values of the above-mentioned variance value table are calculated by using preliminarily prepared face image data samples. From the feature vector set $[v_i]$ in face image samples and its confidence index set $[\theta_i]$, the respective variance values can be calculated as follows.

$$\sigma_{\epsilon,k}(\theta)^2 = \frac{1}{2N_\epsilon(\theta)}\sum_{((i,j)\in W)\cap(\theta=\theta_i)}(v_{i,k}-v_{j,k})^2 \quad (23)$$

$$\sigma_{W,k}(\theta)^2 = \frac{1}{2N_W(\theta)}\sum_{((i,j)\in W)\cap(\theta=\theta_i)}(v_{i,k}-v_{j,k})^2 \quad (24)$$

$$\sigma_{B,k}(\theta)^2 = \frac{1}{2N_B(\theta)}\sum_{((i,j)\in W)\cap(\theta=\theta_i)}(v_{i,k}-v_{j,k})^2$$

Here, the case that "(i,j) belongs to the class W" implies that the data i and the data j are in the same class, namely, it is the data obtained from the same person and is in the within-class, and the case that "(i,j) belongs to the class B" implies that the data i and the data j are in different classes, namely, it is the data obtained from the different person and is in the between-class. Also, $N_\epsilon(\theta)$, $N_W(\theta)$ and $N_B(\theta)$ are the numbers of the combinations of the data belonging to the respective classes. When the variance value is calculated for each bin of $\theta$ in this way, if the number of the data is excessively small, the data of neighboring bins are merged, thereby trying to reserve the number of the samples. This is the method similar to that when the bins are merged by using a k neighboring method (the document of the above-mentioned, Bishop, pp. 53) in the distribution estimation.

Here, in the case of the equation (18), similarly to the equation (4), attention should be paid to the fact of $\sigma_{W,k}([\theta_i])^2 = \sigma_{W,k}(\theta_1)^2 + \sigma_{W,k}(\theta_2)^2$ and $\sigma_{B,k}([\theta_i])^2 = \sigma_{B,k}(\theta_1)^2 + \sigma_{B,k}(\theta_2)^2$.

Here, since the error variance $\sigma_{\epsilon,k}(\theta)^2$ and the within-class variance $\sigma_{W,k}(\theta)^2$ become same, when the face image matching system calculates both of the distances in the equation (8) and the equation (18), it is allowable to share those variance value table.

Also, since there is a strong correlation between a the error distribution and the between-class distribution in many cases, even if the between-class variance $\sigma_{B,k}(\theta)^2$ is used instead of the error distribution $\sigma_{\epsilon,k}(\theta)^2$, the precision is improved over the case when the confidence index is not used. However, the usage of the error distribution provides the better precision.

In this way, the similarity between the face meta-data is calculated by using the posterior distribution data through the confidence index $\theta_{contrast}$ and the confidence index $\theta_{asymmetric}$, thereby enabling the execution of the face verification of the excellent precision. As mentioned above, the computer program can instruct the computer to execute the above-mentioned face similarity calculating procedure.

Here, although the equation (8) and the equation (18) are used to calculate the similarity, it can be approximately calculated by using the various calculating methods such as the following equations (25), (26), thereby attaining the higher speed and the like.

$$d(v_1, v_2) = \frac{1}{2}\sum_{k=1}^{N} \frac{(v_{1,k} - v_{2,k})^2}{\sigma_{\varepsilon,k}(\theta_1)^2 + \sigma_{\varepsilon,k}(\theta_2)^2} + \frac{1}{2}\sum_{k=1}^{N} \ln 2\pi(\sigma_{\varepsilon,k}(\theta_1)^2 + \sigma_{\varepsilon,k}(\theta_2)^2) \quad (25)$$

$$d(v_1, v_2) = \frac{1}{2}\sum_{k=1}^{N} \frac{(v_{1,k} - v_{2,k})^2}{\sigma_{\varepsilon,k}(\theta_1)\sigma_{\varepsilon,k}(\theta_2)} + \frac{1}{2}\sum_{k=1}^{N} \ln 2\pi(\sigma_{\varepsilon,k}(\theta_1)\sigma_{\varepsilon,k}(\theta_2))$$

$$d(v_1, v_2) = \frac{1}{2}\sum_{k=1}^{N} \frac{|v_{1,k} - v_{2,k}|}{\sqrt{\sigma_{\varepsilon,k}(\theta_1)^2 + \sigma_{\varepsilon,k}(\theta_2)^2}} +$$

$$\frac{1}{2}\sum_{k=1}^{N} \ln 2\pi\left(\sqrt{\sigma_{\varepsilon,k}(\theta_1)^2 + \sigma_{\varepsilon,k}(\theta_2)^2}\right)$$

$$d(v_1, v_2) = \frac{1}{2}\sum_{k=1}^{N}\left(\frac{1}{\sigma_{W,k}(\theta_1)^2} - \frac{1}{\sigma_{B,k}(\theta_1)^2}\right)s_k^2 + \quad (26)$$

$$\frac{1}{2}\sum_{k=1}^{N}(\ln 2\pi\sigma_{W,k}(\theta_1)^2 - \ln 2\pi\sigma_{B,k}(\theta_1)^2)$$

$$d(v_1, v_2) = \frac{1}{2}\sum_{k=1}^{N}\left(\frac{1}{\sigma_{W,k}(\theta_2)^2} - \frac{1}{\sigma_{B,k}(\theta_2)^2}\right)|s_k| +$$

$$\frac{1}{2}\sum_{k=1}^{N}(\ln 2\pi\sigma_{W,k}(\theta_2) - \ln 2\pi\sigma_{B,k}(\theta_2))$$

By omitting the calculation of the second term (the term including in) on the right side in each of the above-mentioned equations, the much higher speed operation can be attained.

Also, even if the equation (6) and the equation (16) are used to calculate the similarity, basically similarly, from the preliminarily prepared face image data samples, the covariance matrix $\Sigma_\varepsilon(\theta)$ of the error in the difference vector, the covariance matrix $\Sigma_W(\theta)$ of the within-class of the difference vector, and the covariance matrix $\Sigma_B(\theta)$ of the between-class, which are necessary for the respective calculations, are calculated and prepared as the covariance tables, and that covariance tables may be referred at the time of the similarity calculation. Since this method calculates the distance by using the covariance matrixes, the operation cost is increased. However, if there is the sufficient training samples, the precision of the similarity calculation can be improved.

By assuming the mixture normal distribution for the between-class distribution and the between-class distribution of the equation (14) and the posterior distribution of the equation (3) and estimating the distribution function, it is allowable to calculate the adaptive mixture Mahalanobis distance and the adaptive mixture discriminant distance in the respective equation (10) and equation (20). Also in this case, similarly to the calculation of the posterior distribution data based on the usage of the variance and the covariance matrix, the parameter to specify the mixture distribution of the covariance matrix $\Sigma_s(\theta_1, j)$ representative of the mixture normal distribution, $p(j)$ and the like from the face image data samples may be determined and stored as the table. As for this estimation, it may be estimated by using the EM algorithm and the maximum likelihood method.

In the explanation until now, the case when one image of a face is registered and the retrieval is done by using the one image of the face is explained. However, the case when multiple images are registered for a face of one person and the retrieval is done by using one image of a face, for example, it may be done as follows. That is, the feature vector on the retrieving side is assumed to be $v_{que}$, and the feature vector on the registering side is assumed to be $v_{reg,k}$, and the similarity in the case when the multiple images are registered is assumed to be $d_{multi}(v_{que}, [v_{reg,1}, v_{reg,2}, \ldots, v_{reg,n}])$. Then, the similarity may be calculated on the basis of the calculating equations shown in the following equations (27, 28).

$$d_{multi}(v_{que}, \{v_{reg,1}, v_{reg,2}, \ldots, v_{reg,n}\}) = \frac{1}{n}\sum_{k=1}^{n} d(v_{que}, v_{reg,k}) \quad (27)$$

or, $$d_{multi}(v_{que}, \{v_{reg,1}, v_{reg,2}, \ldots, v_{reg,n}\}) = \min d(v_{que}, v_{reg,k}) \quad (28)$$

Similarly, in the case when multiple images are used per face for both registration and retrieval, the similarity to one face data can be calculated by determining the average and/or the minimum value of the similarities in the combinations of the face features and calculating the similarity between faces. This implies that since the dynamic image is deemed to be the multiple images, the matching system of the present invention can be applied even to the face verification in the dynamic image.

In addition to the face identification and the face verification for person identity as above explanation the present invention can be applied to sex recognition, face expression recognition, age recognition, and other various face recognition systems. For example, the sex recognition to recognize the face between the males and the females may be performed by considering faces of males and faces of females as respective categories and by obtaining data with regard to the respective distributions. Similarly, the face expression recognition to recognize the expression of the face may be performed by considering the categories of the expressions such as smile faces, angry faces, sorrowful faces or the like. The age recognition may be performed by setting the categories such as teens, twenties, thirties and forties, and determining the error distribution, the within-class distribution and the between-class distribution for each category.

As explained above in detail, according to the present invention, the confidence index to represent the confidence is added to the face feature, and it is generated as the face meta-data, thereby enabling the introduction of the adaptive distance through the confidence index. The adaptive distance makes it possible to achieve the high performance face recognition.

The invention claimed is:
1. A face meta-data generating apparatus comprising:
a face feature extracting unit which extracts a face feature from a face image; and
a confidence index extracting unit which extracts a confidence index indicative of a confidence to said face feature, from said face image,
wherein said face feature and said confidence index are generated as a face meta-data, said confidence index extracting unit comprises:
a first confidence index extracting unit which extracts a contrast index of said face image; and
a second confidence index extracting unit which extracts as an asymmetric index of said face image one of a maximum value of differences between said face image and a flipped image obtained by flipping said face image, and one of a sum and an average of powers of pixel values of difference images between said face image and said flipped image.

2. The face meta-data generating apparatus according to claim 1, wherein said first confidence index extracting unit extracts one of a standard deviation and a variance of the pixel values in said face image, as the contrast index of said face image.

3. A face meta-data generating apparatus comprising:
a face feature extracting unit which extracts a face feature from a face image; and
a confidence index extracting unit which extracts a confidence index indicative of a confidence to said face feature, from said face image,
wherein said face feature and said confidence index are generated as a face meta-data,
said confidence index extracting unit comprising:
a first confidence index extracting unit which extracts a contrast index of said face image; and
a second confidence index extracting unit which extracts as an asymmetric index of said face image one of a maximum value of differences between said face image and a flipped image obtained by flipping said face image, and one of a sum and an average of powers of pixel values of difference images between said face image and said flipped image,
said face feature extracting unit extracting said face feature by obtaining a pattern vector $\Lambda$ from said face image, and calculating said face feature using a basis matrix U and a mean vector of said feature vector $\Lambda$,
said basis matrix U is obtained by the linear combination of:
a basis matrix A specified by a subset of basis vectors selected from basis vectors obtained by the principal component analysis of a training set; and
a basis matrix B specified by a flipped subset of basis vectors in which elements of said basis vectors are exchanged to correspond to a conversion of pixel values where a left side and a right side of said face image is flipped.

4. The face recta-data generating apparatus according to claim 3, wherein said pattern vector A has pixels values in said face image as its elements.

5. The face meta-data generating apparatus according to claim 3, wherein said pattern vector A has Fourier components of said face image.

6. A face similarity calculating apparatus which calculates a similarity of a face on the basis of a face feature extracted from a face image and a confidence index indicative of a confidence to said face feature comprising:
a distribution estimating unit which estimates a parameter data with regard to a posterior distribution of a difference vector between said face features, by using said confidence index to said face feature; and
a distance calculating unit which calculates, as said similarity, a distance between said face features obtained from a likelihood of said posterior distribution by using said parameter data, wherein said confidence index comprises a contrast index of said face image and, as an asymmetric index of said face image, one of a maximum value of differences between said face image and a flipped image obtained by flipping said face image, and one of a sum and an average of powers of pixel values of difference images between said face image and said flipped image.

7. The face similarity calculating apparatus according to claim 6, wherein said distance calculating unit, when said posterior distribution of the difference vector between said face features is a normal distribution, calculates, as said similarity, an adaptive Mahalanobis distance obtained from said likelihood of the normal distribution in said confidence index.

8. The face similarity calculating apparatus according to claim 7, wherein said distribution estimating unit estimates a variance of each element of said difference vector to said confidence index, and
said distance calculating unit calculates said adaptive Mahalanobis distance by using the variance of said each element.

9. The face similarity calculating apparatus according to claim 8, wherein said distribution estimating unit includes a variance value table which stores in advance the variance of each element of said difference vector to said confidence index, and reads out a variance required to calculate said adaptive Mahalanobis distance by referring to said variance value table on the basis of said confidence index, and
said distance calculating unit calculates said adaptive Mahalanobis distance by using the variance of said each element.

10. The face similarity calculating apparatus according to claim 6, which calculates as said similarity said adaptive mixture Mahalanobis distance that is obtained from a likelihood of said mixture distribution in said confidence index, when said posterior distribution of a difference vector between said face features is a mixture distribution.

11. A face similarity calculating apparatus which calculates a similarity of a face on the basis of a face feature extracted from a face image and a confidence index indicative of a confidence to said face feature, which, by using said confidence index to said face feature, and estimating a parameter data with regard to a within-class distribution that is said posterior distribution of the difference vectors between said face features in a class which should be deemed to be coincident, and an between-class distribution that is a posterior distribution of the difference vectors between said face features in a class which should be deemed to be inconsistent, calculates, as said similarity, a distance between said face features obtained from a likelihood of a ratio between said within-class distribution and said between-class distribution based on said parameter data, wherein said confidence index comprises an asymmetric index comprising one of a maximum value of differences between said face image and a flipped image obtained by flipping said face image, and one of a sum and an average of powers of pixel values of difference images between said face image and said flipped image.

12. The face similarity calculating apparatus according to claim 11, which calculates as said similarity said adaptive discriminant distance obtained from a likelihood of a ratio between respective distributions in said confidence index, when said within-class distribution and said between-class distribution are respectively the normal distributions.

13. The face similarity calculating apparatus according to claim 12, which estimates a within-class variance and a between-class variance of each element of said difference vector to said confidence index, and calculates as said similarity said adaptive discriminant distance on the basis of said estimated variance.

14. The face similarity calculating apparatus according to claim 13, which the first variance value table for storing in advance said within-class variance and the second variance value table for storing in advance said between-class variance in order to estimate said within-class variance and said between-class variance of each element of the difference vector to said confidence index, refers to said first and second variance value tables, respectively, on the basis of said confidence index estimates the variance, and calculates as said similarity said adaptive discriminant distance on the basis of said estimated variance.

15. The face similarity calculating apparatus according to claim 11, which calculates as said similarity said adaptive mixture discriminant distance obtained from a likelihood of a ratio between the respective mixture distributions in said confidence index by supposing that said within-class distribution and said between-class distribution are mixture distributions, respectively.

16. A face recognizing system comprising:

an image input unit which inputs a first face image;

a face meta-data generating unit which extracts a face feature from said first face image, extracts a contrast index of said first face image as a confidence index indicative of a confidence to said face feature from said first face image and an asymmetric index of said first face image as another confidence index, said asymmetric index comprising one of a maximum value of differences between said face image and a flipped image obtained by flipping said face image, and one of a sum and an average of powers of pixel values of difference images between said face image and said flipped image, and generates said face feature and said confidence indexes as the first face meta-data;

a face meta-data storing unit which stores the second face meta-data;

a face similarity calculating unit which calculates a face similarity between said first face meta-data and each of said second face meta-data; and a control unit which controls said image input unit, said face meta-data generating unit, and said face similarity calculating unit, in response to an input command.

17. A face recognizing method comprising:

extracting a face feature from a first face image;

generating a contrast index of said first face image as a confidence index indicative of a confidence to said face feature, and an asymmetric index of said first face image as another confidence index to said face feature, said asymmetric index comprising one of a maximum value of differences between said face image and a flipped image obtained by flipping said face image, and one of a sum and an average of powers of pixel values of difference images between said face image and said flipped image, as the first face meta-data;

reading out each second face meta-data;

calculating a face similarity between each of said second face meta-data and said first face meta-data, on the basis of said confidence indexes and said face feature of each of said second face meta-data and said first face meta-data; and outputting a matching result of said face image in accordance with said face similarity.

18. A face meta-data generating method for generating a face meta-data from a face image to be used for face image similarity evaluation comprising:

(a) extracting a face feature from a face image;

(b) extracting a contrast index of said face image and an asymmetric index of said face image as a confidence index indicative of a confidence to said face feature from said face image, said asymmetric index comprising one of a maximum value of differences between said face image and a flipped image obtained by flipping said face image, and one of a sum and an average of powers of pixel values of difference images between said face image and said flipped image; and (c) generating said face feature and said confidence index as a face meta-data.

19. The face meta-data generating method according to claim 18, wherein said step (b) includes:

extracting a difference between the maximum value and the minimum value of pixel values in said face image, as the contrast index of said face image.

20. The face meta-data generating method according to claim 18, wherein said step (b) includes:

extracting one of a standard deviation and a variance of the pixel values in said face image, as the contrast index of said face image.

21. A face similarity calculating method for calculating said similarity on the basis of a face feature extracted from a face image and a confidence index indicative of a confidence to the face feature comprising:

estimating a parameter data with regard to a posterior distribution of a difference vector between said face features by using confidence indexes to face features to each of first and second face images; and calculating, as a similarity, a distance between face features from a likelihood by using said parameter data with regard to a posterior distribution, wherein said confidence index comprises a contrast index of said face image and, as an asymmetric index of said face image, one of a maximum value of differences between said face image and a flipped image obtained by flipping said face image, and one of a sum and an average of powers of pixel values of difference images between said face image and said flipped image.

22. The face similarity calculating method according to claim 21, wherein supposing that the posterior distribution of the difference vector between said face features is a normal distribution, calculating an adaptive Mahalanobis distance obtained from the likelihood of the normal distribution in said confidence index as the similarity.

23. The face similarity calculating method according to claim 22, including:

estimating a variance of each element of a difference vector to a confidence index, and calculating the adaptive Mahalanobis distance by using the variance of said each element.

24. The face similarity calculating method according to claim 23, storing in advance the variance of each element of the difference vector to the confidence index, in a variance value table, and referring to said variance value table through the confidence index, and thereby generating a variance value required to calculate the adaptive Mahalanobis distance.

25. The face similarity calculating method according to claim 21, wherein by assuming that the posterior distribution of the difference vector between the face features is a mixture distribution, calculating an adaptive mixture Mahalanobis distance obtained from the likelihood of the mixture distribution in said confidence index as the similarity.

26. A face similarity calculating method for calculating said similarity on the basis of a face feature extracted from a face image and a confidence index indicative of a confidence to the face feature, comprising the steps of:

using a confidence index to a face feature to be compared and estimating a parameter data with regard to a within-class posterior distribution of difference vectors between face features of within-class deemed to be coincident and a between-class posterior distribution of difference vectors between face features of between-class deemed to be inconsistent; and calculating a distance between face features obtained from a likelihood of a ratio between said within-class distribution and said between-class distribution as a similarity, wherein said confidence index comprises a contrast index of said face image and, as an asymmetric index of said face image, one of a maximum value of differences between said face image and a flipped image obtained by flipping said face image, and one of a sum and an average of powers of pixel values of difference images between said face image and said flipped image.

27. The face similarity calculating method according to claim 26, further comprising the steps of:

calculating an adaptive discriminant distance obtained from the likelihood of the ratio between the within-class and between-class distributions in said confidence index as the similarity, when said within-class distribution and said between-class distribution are normal distributions.

28. The face similarity calculating method according to claim 27, further comprising the steps of:

estimating a within-class variance and a between-class variance of each element of a difference vector to a confidence index; and calculating the adaptive discriminant distance as the similarity.

29. The face similarity calculating method according to claim 28, further comprising the steps of:

including the first variance value table for storing in advance the within-class variance and the second variance value table for storing in advance the between-class variance to estimate the within-class variance and the between-class variance of each element of the difference vector to the confidence index; and estimating the variance value needed in the adaptive discriminant distance by referring to the first and second variance value tables, respectively, through the confidence index.

30. The face similarity calculating method according to claim 26, further comprising the steps of:

assuming that said within-class distribution is a mixture distribution and said between-class distribution is another mixture distribution and calculating an adaptive mixture discriminant distance obtained from a likelihood of a ratio between the mixture distributions in said confidence index as the similarity.

31. A computer readable medium having a stored computer readable program for operating on a computer for a meta-data generating program comprising instructions that cause the computer to perform the steps of:

extracting a face feature from a face image;

extracting a contrast index of said face image and an asymmetric index of said face image as a confidence index indicative of a confidence to said face feature from said face image, said asymmetric index comprising one of a maximum value of differences between said face image and a flipped image obtained by flipping said face image, and one of a sum and an average of powers of pixel values of difference images between said face image and said flipped image; and generating said face feature and said confidence index as a face meta-data.

32. A computer readable medium having a stored computer readable program for operating on a computer for executing a similarity calculating program, comprising instructions that cause the computer to perform the steps of:

extracting a face feature from said face image;

extracting a contrast index of said image and an asymmetric index of said face image as a confidence index indicative of a confidence to said face feature from said face image, said asymmetric index comprising one of a maximum value of differences between said face image and a flipped image obtained by flipping said face image, and one of a sum and an average of powers of pixel values of difference images between said face image and said flipped image; and calculating a similarity on the basis of said face feature and said confidence index.

33. A computer readable medium having a stored computer readable program for operating on a computer for executing a face verifying program, comprising instructions that cause the computer to perform the steps of:

generating a contrast index of a face image as a face feature extracted from an input image and an asymmetric index of said face image as the face feature extracted from the input image and a confidence index indicative of a confidence to the face feature as a face meta-data, said asymmetric index comprising one of a maximum value of differences between said face image and a flipped image obtained by flipping said face image, and one of a sum and an average of powers of pixel values of difference images between said face image and said flipped image;

storing generated face meta-data in a face meta-data storing unit;

inputting a face meta-data of a certain face image and each of said face meta-data stored in said face meta-data storing unit, and calculating a face similarity on the basis of the face feature and the confidence index indicative to the confidence to the face feature; and outputting a face image matching result in accordance with said face similarity.

* * * * *